United States Patent [19]

Bridgen

[11] Patent Number: 4,742,231
[45] Date of Patent: May 3, 1988

[54] RADIATION SENSOR

[75] Inventor: John D. Bridgen, Staines, England

[73] Assignee: Hanovia Limited, Berkshire, England

[21] Appl. No.: 853,410

[22] Filed: Apr. 18, 1986

[30] Foreign Application Priority Data

Apr. 24, 1985 [GB] United Kingdom ............... 8510426

[51] Int. Cl.$^4$ .......................... C02B 1/32; G01J 3/50
[52] U.S. Cl. .................................. 250/372; 250/435; 250/436
[58] Field of Search ............... 250/372, 373, 435, 436, 250/455.1

[56] References Cited

U.S. PATENT DOCUMENTS

| | | | |
|---|---|---|---|
| 3,281,597 | 10/1966 | Greenberg | 250/343 |
| 3,562,520 | 2/1974 | Hippen | 250/372 |
| 3,858,048 | 12/1974 | Shand et al. | 250/372 |
| 4,201,916 | 5/1980 | Ellner | 250/372 |
| 4,602,162 | 7/1986 | Sperry III et al. | 250/435 |

Primary Examiner—Carolyn E. Fields
Attorney, Agent, or Firm—Lowe, Price, LeBlanc, Becker & Shur

[57] ABSTRACT

The invention relates to measuring the ultra-violet radiation received from tubular ultra-violet source mounted within a quartz sleeve, the radiation passing through water within a tubular circuit coaxial with the source and sleeve. A sensor probe fits within a socket formed in the wall of the conduit. The probe comprises a plane quartz window at one end and an ultra-violet sensor tube at the other end. Radiation from the window passes through an iris, whose size and position are chosen so that the source projects an image through the iris which is at least twice the size of the sensitive area on the sensor. In order to minimize inconsistencies due to faulty positioning of the sensor tube, the axis of the tube is preferably at right angles to the axis of the source. The output of the sensor is connected with a logic circuit which has means for providing a multi-state indication of radiation within the conduit.

9 Claims, 3 Drawing Sheets

RADIATION SENSOR

The invention relates to a radiation sensor.

When it is desired to sense radiation generated within a container by a sensor located outside the container, a window for the radiation must be provided in the container wall. The output of the sensor will be affected by the transmission properties of the window, and if the window becomes dirty, the sensor reading will not give a true indication of radiation within the container. If it is difficult to gain access to the interior of the container to clean the window, it is necessary to make the window removable from the remainder of the container.

According to the invention there is provided a radiation sensor assembly for use with a container having an aperture for a window, comprising a probe having a window for fitting in the aperture at one end and a radiation sensor at the other end and means for securing the probe to the container so that radiation within the container can pass through the window on to the sensor.

With this arrangement the probe can be removed from the container and the window cleaned, but there will be no problem in re-aligning the sensor with the window because the sensor is mounted on the probe and remains fixed relative to the window when the probe is removed from the container.

There may be focussing means (which may be an iris) of the probe to provide an incident beam of radiation on the sensor which is greater than a sensitive area of the sensor.

The incident beam may have an area at least twice the area of the sensitive area of the sensor.

The container may have an elongate source and the sensor may be elongate, and the respective axes of the source and sensor may be substantially at right angles.

The probe may comprise a cylindrical body and the container may have a cylindrical socket, the body and socket being complementary.

The body may be a sliding fit within the socket.

The securing means may comprise a sleeve overlapping the socket and body and may be secured releasably to the socket.

The end of the socket remote from the container may abut a shoulder of the body, whereby the body is supported in the socket.

The window may be flush with the interior of the container, and may be a plane quartz window.

The sensor may be adapted to convert incident radiation into an electrical output which is connected to a logic circuit means.

The logic circuit means may include means to provide a multi-state indication of radiation within the container.

The multi-state indication means may comprise two comparators connected with the output of the sensor, each comparator may be connected to a potential divider means, and the potential divider means may be connected with means to indicate the state of radiation within the conduit.

The potential divider means may comprise a chain of resistors and the indication means may comprise a plurality of separate visual indicator means.

The multi-state indication means may provide an indication of the radiation from the container which is between 100% and 55% of the maximum, between 55% and 50% of the maximum, and below 50% of the maximum.

The sensor, body and window may comprise a single unit.

The container may comprise a tubular ultra-violet source mounted within a quartz sleeve within a tubular conduit housing the aperture.

According to a further aspect, the invention may provide a water purification system, comprising an assembly as hereinbefore defined, the container housing water to be purified and an ultra-violet source for purifying the water, and the assembly sensing the intensity of ultra-violet radiation.

An embodiment of the invention as hereinafter described, by way of example, with reference to the accompanying drawings.

Figure 1:
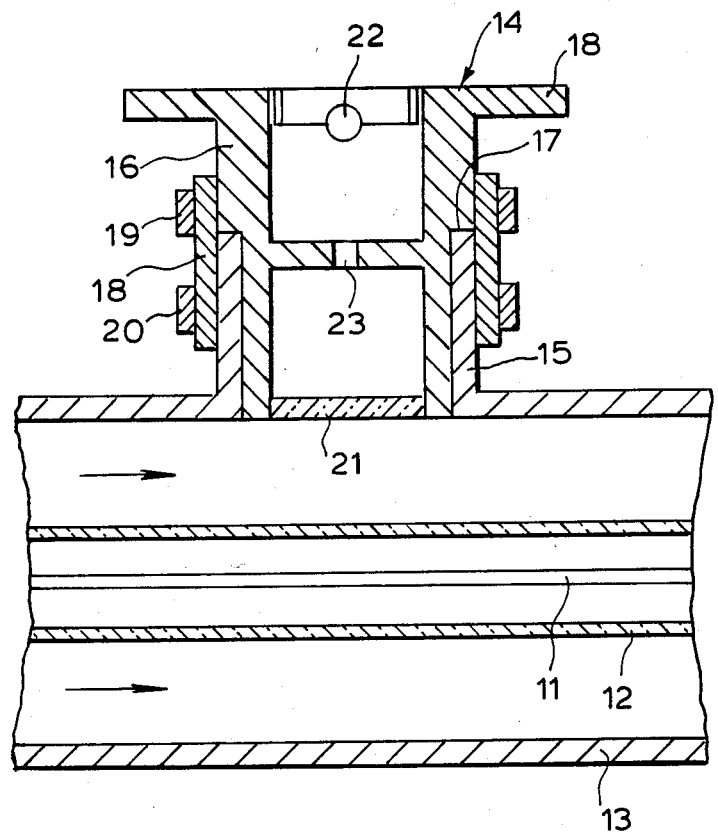
FIG. 1 is a longitudinal section through a radiation sensor assembly according to the invention.

FIG. 1 shows an application of the invention to measuring the ultra-violet radiation received from a tubular ultra-violet source 11 mounted within a quartz sleeve 12, the radiation passing through water within a tubular conduit 13 coaxial with the source and sleeve. A sensor probe 14 fits within a socket 15 formed in the wall of the conduit.

Figure 2:
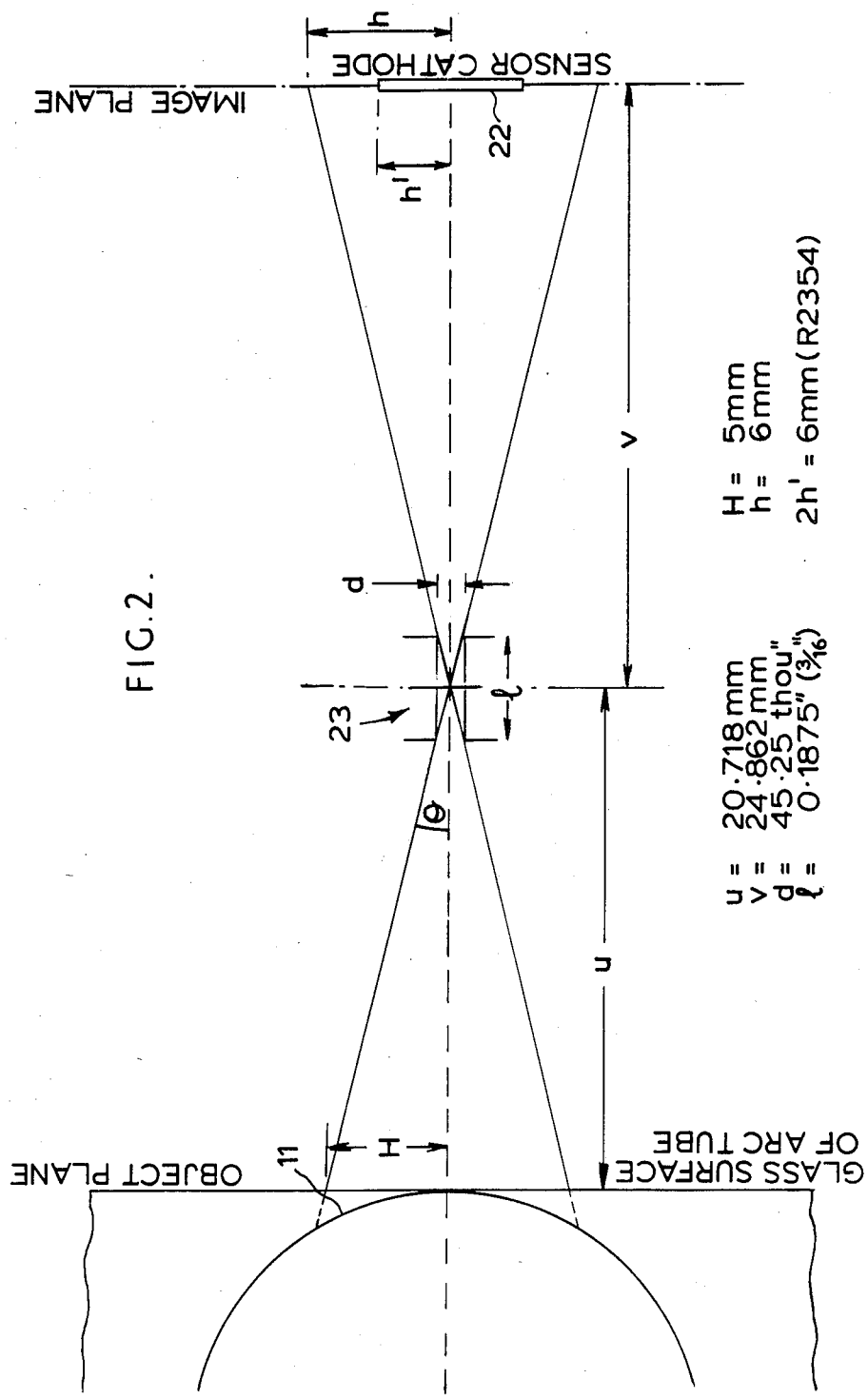
FIG. 2 shows a typical set of dimensions for the apparatus of FIG. 1.

The probe 14 comprises a plane quartz window 21 at one end and an ultra-voilet sensor tube 22 at the other end. Radiation from the window 21 passes through an iris 23, whose size and position are chosen so that the source projects an image through the iris which is at least twice the size of the sensitive area on the sensor. In order to minimize inconsistencies due to faulty positioning the sensor tube 22, the axis of the tube 22 is preferably at right angles to the axis of the source 11. A typical set of dimensions of the probe is shown in FIG. 2.

The probe 14 has a cylindrical body 16 with an external shoulder 17 and a flange 18 at the end remote from the window 21. The body 16 fits with the socket 15, so that when the shoulder 17 abuts the mouth of the socket, the window 21 is aligned with the interior wall of the conduit 13. The probe is secured in position by a sleeve 18 of plastics material which is permanently secured to the body 16 by a band 19 and which is releasably secured to the exterior of the socket by a screw clip band 20. The external diameter of the body is substantially the same as that of the socket, so that they are flush.

The source 11 is selected to transmit ultra-violet radiation in the narrow band of 200 to 320 nm, since it is radiation in this band which kills bacteria in water. Similarly the sensor tube 22 is made sensitive to this narrow band. The radiation reaching the tube 22 depends on the emission of the source 11, the transmission of the sleeve 12, the transmission of the water between the sleeve 12 and the window 21 and the transmission of the window 21. The sensor tube 22 is used to indicate when the water within the conduit 13 has probably become unsuitable, either because the radiation from the source 11 is of insufficient power, or that foreign bodies have entered the water in the conduit 13 and other steps must be taken to remove such bodies to make the water suitable. The output of the sensor tube 22 is thus connected at 22′ to a logic circuit generally indicated in FIG. 3 for giving suitable indications.

Figure 3:
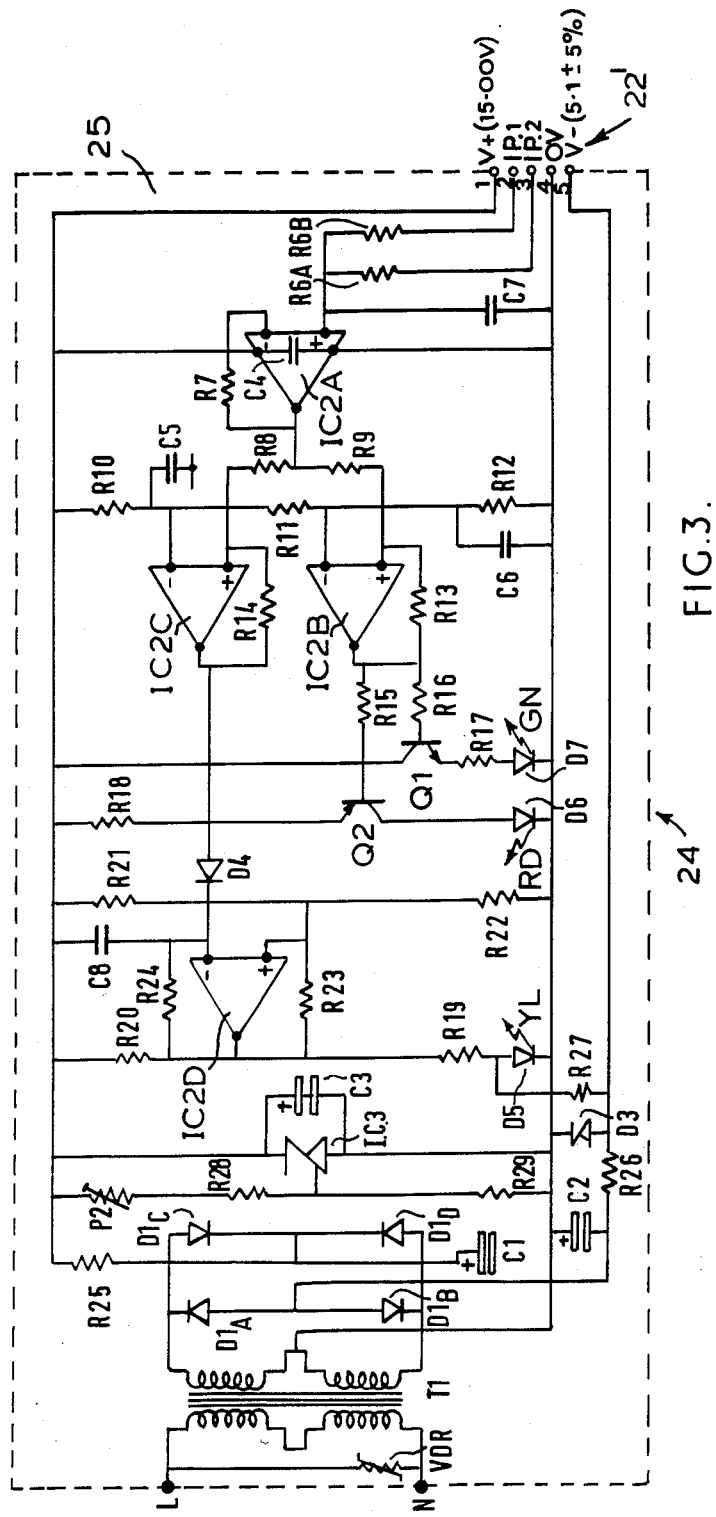
FIG. 3 shows a circuit for connection to the sensor of FIGS. 1 and 2.

The output of the sensor tube 22 is in nano-ampères, and so a suitable amplifier is mounted in the probe 14. The amplified output is then transmitted over a cable to a printed circuit 24 on a board 25 (the boundary of which is shown in dashed lines) mounted at a suitable location adjacent to the probe 14. As shown in FIG. 3, the amplified sensor signal received from the connecting cable is further amplified by the integrated circuit IC2A and is then passed to two comparators, IC2B and IC2C, each connected to a potential divider chain of resistors R10, R11 and R12. The comparator IC2C works in conjunction with the potential divider chain to give an output when the signal received from the sensor tube drops below 55% of its maximum value (achieved when a new source tube 11 radiates clean water through a freshly cleaned window 14) and this output activates an oscillator IC2D energizing a yellow lamp YL.

A green lamp GN is normally energized from the amplifier IC2A, but the comparator IC2B works in conjunction with the potential divider chain to give an output when the signal received from the tube 22 drops below 50% of its maximum and when the output is generated, the transistor Q1 energizing the green lamp GN is disabled and a transistor Q2 energizing a red lamp RD is enabled.

It will therefore be seen that the circuit of FIG. 3 provides a three state indication of radiation within the conduit 13. When radiation sensed is within 100% and 55% of the maximum, the green lamp is constantly energized, indicating that all is well. When the signal drops below 55% but is still above 50% of the maximum, the green lamp remains energized, but the yellow lamp flashes to indicate that the conduit 13 and probe 14 require attention. If nothing is done and the signal from the sensor 22 drops below 50% of its maximum, the green lamp continues to flash indicating that immediate action is required. The operator will then stop the flow of water through the conduit 13, undo the clip band 20 and remove the probe 14 from the socket 15, inspect and if necessary clean the window 21, inspect and if necessary clean the sleeve 12 and inspect and if necessary replace the source 11. If an excessive amount of foreign bodies appear to be present within the apparatus, he should also investigate the source of water supply since the ultra-violet radiation will only kill bacteria in the water and will not deal otherwise with such foreign bodies. The apparatus is then re-assembled, and the water flow continues with the source 11, replaced as necessary, re-energized.

Because the sensor tube 22 is mounted in a single unit with the window 21 in the probe 14, there is no problem about re-aligning the tube 22 with the radiation it is designed to receive and in particular the arrangement of having the sensor tube axis at right angles to the source tube axis minimizes any inconsistency due to a slight error in positioning. The socket 15 abutting the shoulder 17 together with the sleeve 18 ensure a water-tight fit of the probe 14 in the conduit 13. The alignment of the window 21 with the interior wall of the conduit 13 ensures that the waterflow discourages deposit of foreign bodies on the window 21.

I claim:

1. A water purification system comprising:
   a tubular conduit defining an aperture in a side wall thereof, a cylindrical socket mounted on said conduit and surrounding the aperture, said conduit comprising means for containing water to be purified;
   a tubular quartz sleeve mounted within the conduit, and a tubular ultraviolet source mounted within said sleeve;
   and a radiation sensor assembly comprising:
   an elongated cylindrical probe having a window at one end, the end of said probe adjacent the window being shaped such that it is slidably received within said socket;
   a shoulder mounted on said probe and spaced away from said window abutting the end of said socket remote from the conduit wheein said probe is dimensioned so as to be supported in said socket, and said window is disposed flush with the interior of said conduit;
   a radiation sensor mounted in an end of said probe opposite the window;
   focusing means in said probe for providing an incident beam of radiation on said sensor which is greater than the sensitive area of said sensor; and
   means for securing the probe to the conduit so that radiation within the conduit can pass through the window and onto the sensor.

2. The system as defined in claim 1, wherein the incident beam has an area at least twice the area of the sensitive area of the sensor.

3. the system as defined in claim 1 wherein the sensor is elongate, the respective axes of the source and sensor being substantially at right angles.

4. A system as defined in claim 1 wherein the sensor comprises means for converting incident radiation into an electrical output, and for coupling said output to logic circuit means.

5. The system as defined in claim 4, wherein the logic circuit means includes means to provide a multi-state indication of radiation within the container.

6. The system as defined in claim 12, wherein the multi-state indication means comprises two comparators connected with the output of the sensor, wherein each comparator is connected to a potential divider means, and wherein the potential divider is connected with means to indicate the state of radiation within the conduit.

7. A system as defined in claim 6 wherein the potential divider means comprises a chain of resistors and the indication means comprises a plurality of separate visual indicator means.

8. The system as defined in claim 5, wherein the multi-state indication means provides an indication of the radiation from the container which is between 100% and 55% of the maximum, between 55% and 50% of the maximum, and below 50% of the maximum.

9. The system as defined in claim 1, wherein the sensor, probe and window comprise a single unit.

* * * * *